(12) United States Patent
Wiseman

(10) Patent No.: US 6,401,935 B1
(45) Date of Patent: Jun. 11, 2002

(54) SHALE SHAKER SCREEN RETAINER

(76) Inventor: Michael D. Wiseman, 5323 Graystone La., Houston, TX (US) 77069

( * ) Notice: Subject to any disclaimer, the term of this patent is extended or adjusted under 35 U.S.C. 154(b) by 0 days.

(21) Appl. No.: 09/559,226

(22) Filed: Apr. 26, 2000

(51) Int. Cl.[7] .............................. B07B 1/49; F16B 2/14
(52) U.S. Cl. ...................... 209/403; 209/405; 160/378; 403/374.1; 403/409.1
(58) Field of Search ................................. 209/399, 402, 209/403, 405, 408, 409, 412, 413; 160/328, 378; 403/374.1, 405.1, 409.1

(56) References Cited

U.S. PATENT DOCUMENTS

| | | | | |
|---|---|---|---|---|
| 5,332,101 A | * | 7/1994 | Bakula | .................... 209/405 X |
| 5,392,925 A | | 2/1995 | Seyffert | ..................... 209/405 |
| 5,811,003 A | * | 9/1998 | Young et al. | ........... 209/403 X |
| 5,971,159 A | | 10/1999 | Leone et al. | ................. 209/399 |
| 6,119,868 A | * | 9/2000 | Hiltl | ....................... 209/405 X |

* cited by examiner

Primary Examiner—Tuan N. Nguyen
(74) Attorney, Agent, or Firm—A.M. Arismendi, Jr.; Lundeen & Arismendi, LLP

(57) ABSTRACT

There is provided a shale shaker having at least a base, a shaker screen, a basket, and a screen retainer for releasably mounting the shaker screen to the basket. The basket is mounted movably with respect to and on the base. The screen retainer has at least a cam surface and a tensioning device. The tensioning device has at least a bearing surface in contact with the cam surface, a spring responsive to the bearing surface, and at least one screen contact surface for engaging the shaker screen when the spring is placed in compression by the exertion of force by the cam surface on the bearing surface.

12 Claims, 4 Drawing Sheets

SHALE SHAKER SCREEN RETAINER

BACKGROUND OF THE INVENTION

1. Field of the Invention

The present invention is directed to shale shakers with vibrating screens, and, in one aspect, to an apparatus for releasably retaining the screens.

2. Description of Related Art

The prior art disclosed a wide variety of vibrating screens, devices which use them, shale shakers, and screens for shale shakers. In shale shakers which use a plurality of screens, problems arise relative to easily and efficiently securing and replacing the screens.

The need for solids control in drilling mud in hydrocarbon well drilling is well known in the prior art. Drilling mud, typically a mixture of clay, water and various additives, is pumped through a hollow drill string (pipe, drill collar, bit, etc.) down into a well and exits through holes in a drill bit. The mud picks up cuttings (rock bits) and other solids from the well and carries them upwardly away from the bit and out of the well in a space between the well walls and the drill string. At the top of the well, the solids-laden mud is introduced to a shale shaker, a device which typically has a series of screens arranged in tiered or flat disposition with respect to each other. The screens catch and remove solids from the mud as the mud passes through them. If drilled solids are not removed from the mud used during the drilling operation, recirculation of the drilled solids can create viscosity and gel problems in the mud, as well as increasing wear in mud pumps and other mechanical equipment used for drilling. In some shale shakers, a fine screen cloth is used with the vibrating screen. The screen may have two or more overlying layers of screen cloth. The frame of the vibrating screen is suspended or mounted upon a support and is caused to vibrate by a vibrating mechanism, e.g. an unbalanced weight on a rotating shaft connected to the frame. Each screen may be vibrated by vibratory equipment to create a flow of trapped solids toward an end of the screen on a top surface of the screen for removal and disposal of solids. The fineness or coarseness of the mesh of a screen may vary depending upon mud flow rate and the size of the solids to be removed.

In certain prior art shale shakers having a plurality of screens, releasably securing and lower level. This is particularly true if wooden wedges are used to secure the screens.

U.S. Pat. No. 5,392,925 discloses the use of a pair of wedges with their inclined surfaces being in contact. The lower wedge rests on mounting bars. The upper wedge has a threaded bolt attached to it on one end. The other end of the bold extends through the side of the basket and is engaged by a nut. As the nut tightens, the upper wedge slides up the lower wedge exerting an upward force onto a lower surface of the screen frame to maintain the upper surface of the screen frame against a mounting surface of the basket.

U.S. Pat. No. 5,971,159 discloses a cam latch secured to an outside surface of a side wall of the basket. A latching bar extending through an opening in the side wall of the basket is used to secure the screen frame against a mounting bracket. A pivot pin rides in a cam slot to adjust the height of the latching bar to a thickness of the screen frame. As a handle is pivoted, latching bar pivots about the pivot pin and presses against the screen frame against the mounting bracket.

Accordingly, there is a need to enhance the efficiency and ease with which screens are replaced and secured.

SUMMARY OF THE INVENTION

In one aspect of the present invention, there is provided a shale shaker having at least a base, a shaker screen, a basket, and a screen retainer for releasably mounting the shaker screen to the basket. The basket is mounted movably with respect to and on the base. The screen retainer has at least a cam surface and a tensioning device. The tensioning device has at least a bearing surface in contact with the cam surface, a spring responsive to the bearing surface, and at least one screen contact surface for engaging the shaker screen when the spring is placed in compression by the exertion of force by the cam surface on the bearing surface.

In one embodiment, the basket has a side wall and a sleeve attached to the side wall with a hole extending substantially perpendicular to the side wall through the sleeve and side wall. The screen retainer has a rod, a device for axially rotating the rod, and a disk having a center, a perimeter and a perimeter surface. The rod extends through the hole and the rod has an outside portion and an inside portion. The outside portion is attached to device for axially rotating the rod. The inside portion of the rod is attached to the disk between the center and the perimeter of the disk and the perimeter surface is the cam surface.

The tensioning device is formed in part of a polymeric material. Further, the tensioning device has a recess, such as a hole or a saddle, capable of receiving the disk. The recess is defined by the bearing surface. The spring is an elongated spring embedded in the polymeric material and laying in a plane which is substantially parallel to the side wall when the tensioning device is in an installed position. The at least one screen contact surface is two screen contact surfaces extending below a lower surface of the tensioning device. The elongated spring is located between the hole or saddle and the screen contact surfaces. The two screen contact surfaces are spaced from each other to allow deflection of the lower surface and the elongated spring when the screen retainer is in a position for retaining the shaker screen.

Alternatively, the tensioning device has an upper portion, an elongated spring having first and second end portions and a mid portion, and two screen contact surfaces. The elongated spring is located between the upper portion and the two screen contact surfaces. One screen contact surface is located on the first end portion. The other screen contact surface is located on the second end portion. The upper portion is attached to the mid portion and has a recess, such as a hole or a saddle, capable of receiving the disk. The recess is defined by the bearing surface.

In another alternative, the tensioning device has a first portion having a recess, such as a hole or a saddle, capable of receiving the disk and a second portion formed of an elastomeric polymer. The second portion is attached to the first portion. The recess is defined by the bearing surface and has a screen contact portion. The second portion deforms in part when the tensioning device is retaining a shaker screen which results from compressing a part of the second portion (i.e., a part of the elastomeric polymer) between the perimeter surface and the shaker screen. Due to its elastomeric properties, the compressed part of the second portion acts as a spring under load wanting to return to its original state once the force exerted by the cam surface onto the bearing surface is released.

BRIEF DESCRIPTION OF THE DRAWINGS

A more particular description of the embodiments of the invention briefly summarized above may be had by referenced to the embodiments which are shown in the drawings which form a part of this specification. These drawings illustrate certain preferred embodiments that are not to be used to improper delimit the scope of the invention which may have other equally effective or equivalent embodiments.

DETAILED DESCRIPTION OF THE INVENTION

Figure 1:
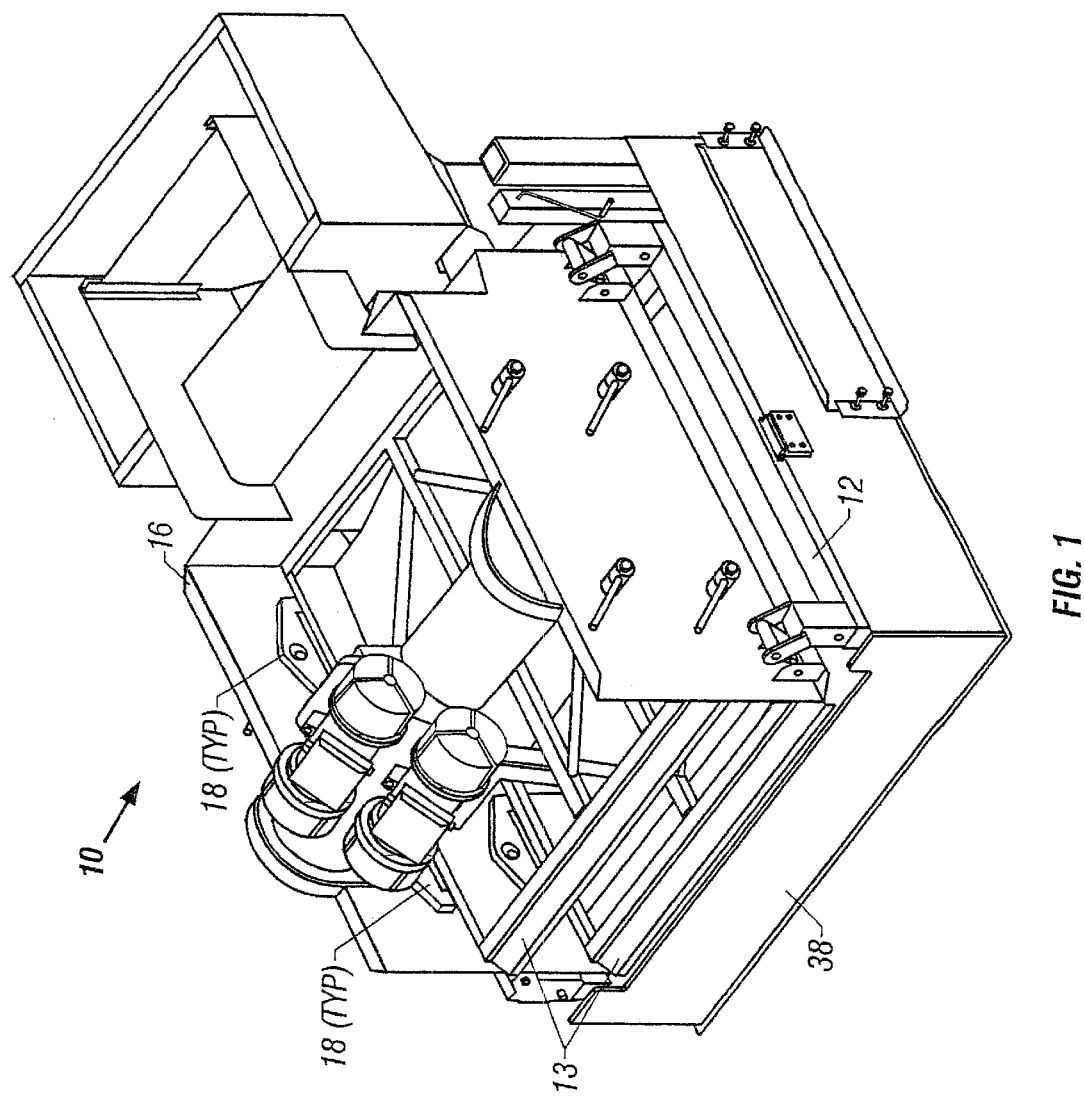
FIG. 1 is a perspective corner and slightly elevated view of a shaker according to the present invention without screens in place.
Figure 2:
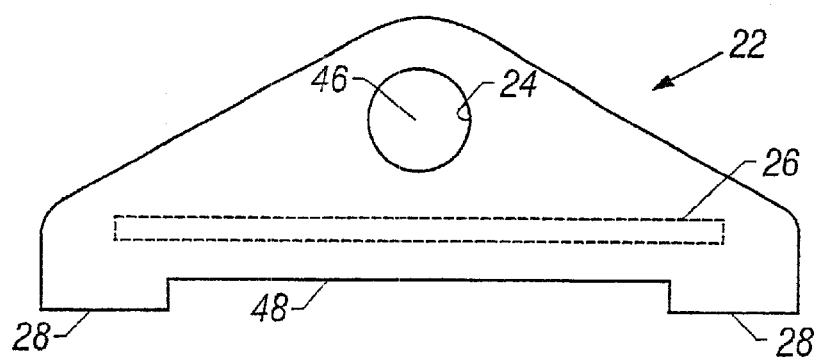
FIG. 2 is a side view of a tensioning device.
Figure 3:
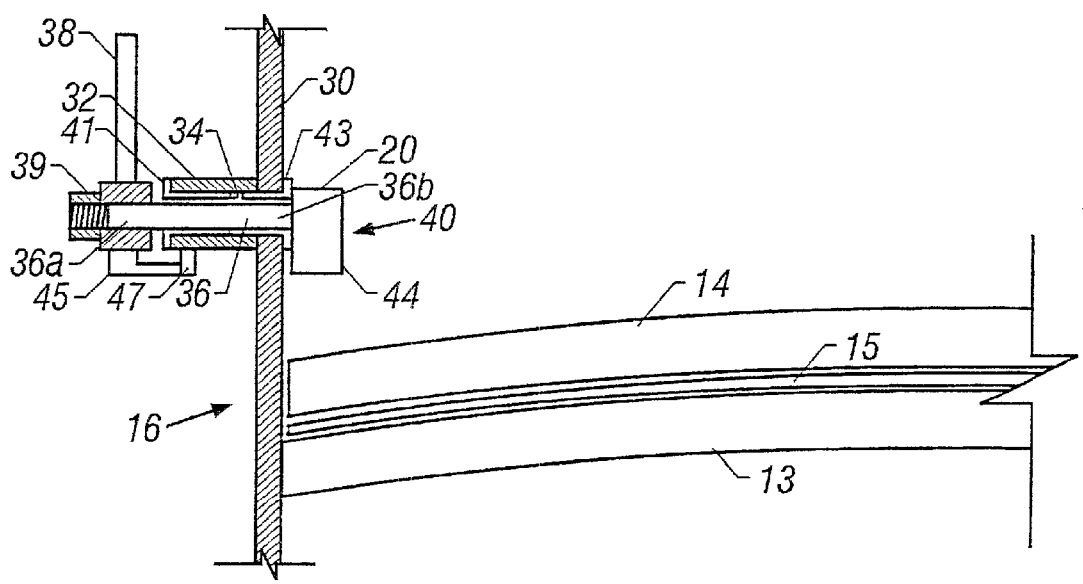
FIG. 3 is a partial cross-sectional view of the basket of the shale shaker shown in FIG. 1 at the screen retainer.
Figure 4:
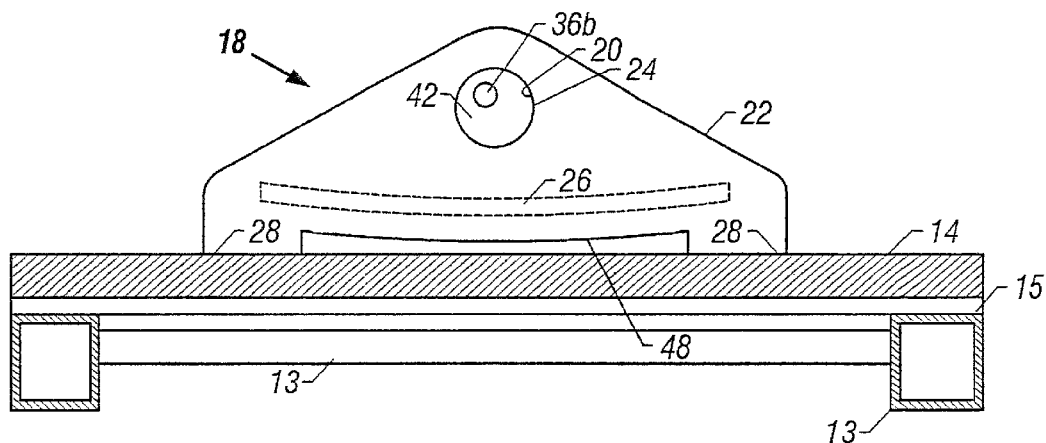
FIG. 4 is a view of a screen detained by a tensioning member according to the present invention.

Referring to FIG. 1, there is shown a shale shaker 10 having a base 12, shaker screen supports 13, a basket 16, and screen retainers 18 for releasably mounting the shaker screen 14 (not shown) to the basket 16. The basket 16 is mounted movably with respect to and on the base 12. Referring to FIGS. 2, 3 and 4, the screen retainer 18 has a cam surface 20 and a tensioning device 22. The tensioning device 22 has a bearing surface 24 in contact with the cam surface 20, a spring 26 responsive to the bearing surface 24, and a screen contact surface 28 for engaging the shaker screen 14 when the spring 26 is placed in compression by the exertion of force by the cam surface 20 on the bearing surface 24. As shown in FIGS. 3 and 4, there is a seal 15 between the screen 14 and the screen supports 13. Referring to FIGS. 1 and 3, the basket 16 has a side wall 30 and a sleeve 32 attached to the side wall 30 with a hole 34 extending substantially perpendicular to the side wall 30 through the sleeve 32 and side wall 30. The screen retainer 18 has a rod 36, a handle 38 for axially rotating the rod 36, and a disk 40 having a center 42, a perimeter 44 and a perimeter surface, which is the cam surface 20. The rod 36 extends through the hole 34 and the rod 36 has an outside portion 36a and an inside portion 36b. The outside portion 36a is attached to handle 38 with a nut 39. The inside portion 36b is attached to the disk 40 between the center 42 and the perimeter 44 of the disk 40.

On the sleeve side of hole 34, a bushing 41 is inserted. On the inside surface of the sidewall 30, a bushing 43 is inserted into hole 34. With bushings 41 and 43 in place, rod 36 is inserted through the hole 34 Handle 38 is attached to outside portion 36a of rod 36 with a nut 39. Stop 45 is attached to handle 38. Stop 47 is attached to the sleeve 32. Stops 45 and 47 prevent over rotation of the rod 36. Since the inside portion 36b of rod 36 is secured off center relative to disk 40, stops 45 and 47 are set such that a 10 degree over rotation once maximum tension force is applied to the tensioning device 22. This locks the tensioning device 22 under in a tensioning position. This particular example the over rotation is about 10 degrees, though any particular over rotation which maintains the tensioning device 22 in a locked tension position is suitable.

Figure 5:
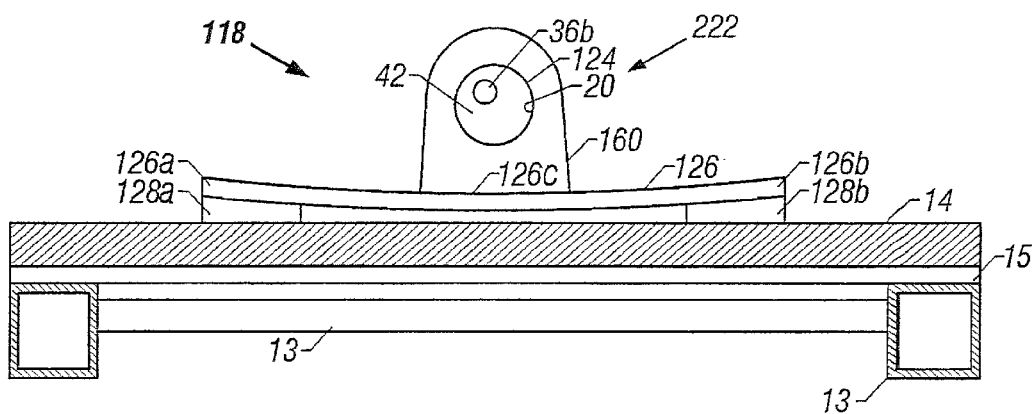
FIG. 5 is a view of a screen retained by another embodiment of a tensioning member according to the present invention.

The tensioning device 22 is formed in part of a polymeric material. Further, the tensioning device 22 has a hole 46 capable of receiving the disk 40. The hole 46 is defined by the bearing surface 24. The spring 26 is an elongated spring embedded in the polymeric material and laying in a plane which is substantially parallel to the side wall 30 when the tensioning device 22 is in an installed position. The two screen contact surfaces 28 extend below a lower surface 48 of the tensioning device 22. The elongated spring 26 is located between the hole 46 and the screen contact surfaces 28. The two screen contact surfaces 28 are spaced from each other to allow deflection of the lower surface 48 and the elongated spring 26 when the screen retainer 18 is in a position for retaining the shaker screen 14 as shown in FIG. 4. FIG. 2 shows the tensioning device 22 of the screen retainer 18 in its relaxed position, FIG. 5 shows another embodiment of the screen retainer 118. In this embodiment the tensioning device 122 has an upper portion 160, an elongated spring 126 having first end portion 126a, a second end portion 126b and a mid portion 126c, and two screen contact surfaces 128a and 128b. The elongated spring 126 is located between the upper portion 160 and the two screen contact surfaces 128a and 128b. One screen contact surface 128a is located on the first end portion 126a. The other screen contact surface 128b is located on the second end portion 126b. The upper portion 160 is attached to the mid portion 126c and has a hole 146 capable of receiving the disk 40. The hole 146 is defined by the bearing surface 124. Hole 146 is filled by disk 40. The cam surface 20 is in contact with the bearing surface 124. The view shown in FIG. 5 shows the tensioning device 122 in a tension position with near portion 36b of rod 36 shown above the center of disk 42. Further, the spring 126 is shown in deflected position.

Figure 6:
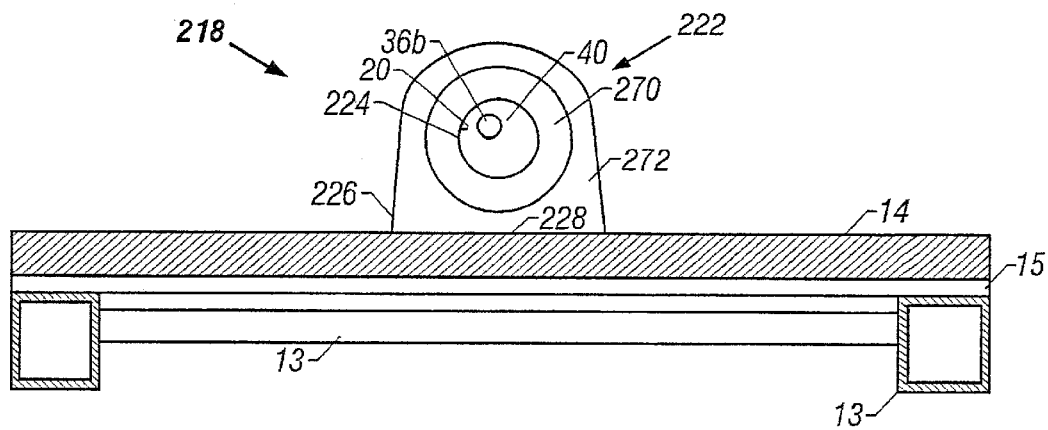
FIG. 6 is a view of a screen retained by yet another embodiment of a tensioning member according to the present invention.

FIG. 6 shows another embodiment of the screen retainer 218 under tension. In this embodiment, the tensioning device 222 has a first portion 270 having a hole 246 (not shown since filled with disk 40) capable of receiving the disk 40 and a second portion 272 formed of an elastomeric polymer. The second portion 272 is attached to the first portion 270. The hole 246 is defined by the bearing surface 24 and has a screen contact portion 228. The second portion 272 deforms in part when the tensioning device 222 is retaining a shaker screen 14 which results from compressing a part 226 of the second portion 272 (i.e., a part of the elastomeric polymer) between the perimeter surface 20 (i.e., cam surface) and the shaker screen 14. Due to its elastomeric properties, the compressed part 226 of the second portion 272 acts as the spring under load wanting to return to its original state once the force exerted by the cam surface 20 onto the bearing surface 224 is released.

Figure 7:
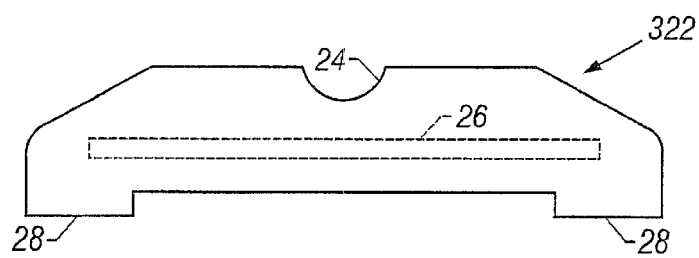
FIG. 7 is a side view of a tensioning device similar to that shown in FIG. 2, but it has a saddle instead of a hole for receiving the disk.

Referring now to FIG. 7, there is shown a tensioning device 322 similar to that shown in FIG. 2 with the exception that the bearing surface 24 defines a saddle for receiving disk 40, rather that a hole 46. A similar modification may be made to the tensioning devices 122 ad 222, where the holes 46 are converted to saddles.

Figure 8:
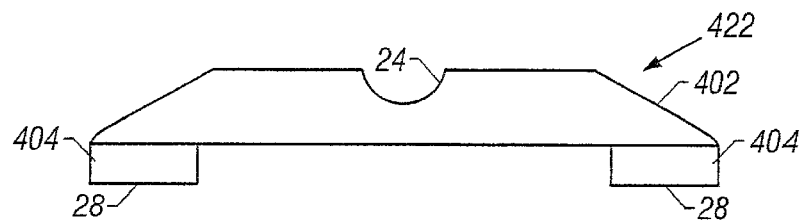
FIG. 8 is a side view of a tensioning device having a saddle, a rigid upper portion and elastomeric pads (which act as a spring in this configuration).

Referring now to FIG. 8, there is shown a tensioning device 422 having a bearing surface 24 in the shape of a saddle, a rigid upper portion 402 and elastomeric pads 404 having screen contact surfaces 28. The pads 404 are attached to the rigid upper portion 402. The pads 404 in this embodiment act as the spring member similar to compressed part 226 of tensioning device 222.

The polymer used in tensioning devices 22, 122 and 222 may be a thermoset or thermoplastic polymer, preferably an elastomer. In the case of the tensioning device 22, the elastomer allows the spring 26 to bend under tension and return to normal when tension is released. In a prototype of the tensioning device 22, the elastomer used was a thermoset castable polyurethane prepolymer, which was PTMEG polyether based and extended with 4,4'-methylene-bis-o-chloroanaline. The cured polyurethane had a 75 Shore D hardness. Extra lubricity was achieved with the addition of a dispersible silicone additive. This polyurethane was obtained from CAM Speciality Products, Inc., Spring, Tex.

The spring 26 may be made of any material having spring characteristics. In a prototype of the embodiment shown in FIG. 2, the spring 26 was made of a rod of 17-4 stainless steel, which is a heat treated stainless steel. This type of stainless steel is preferred since it does not need to be cleaned or milled after the heat treatment.

What is claimed is:

1. A screen retainer for releasably mounting a framed screen to a screen support mounted within a basket, the screen retainer comprising:
   a cam surface; and
   a tensioning device having at least
      a bearing surface in contact with the cam surface,
      a spring responsive to the bearing surface, and
      at least one screen contact surface for engaging and placing a compressive force on the screen when the screen is supported by the screen support and the spring is placed in compression by the exertion of force by the cam surface on the bearing surface,
      wherein the cam surface and tensioning device are located within the basket in an installed position.

2. The screen retainer of claim 1,
   wherein the basket has a side wall and a sleeve attached to the side wall with a hole extending substantially perpendicular to the side wall through the sleeve and side wall,
   wherein the screen retainer has
      a rod extending through the hole, the rod having an outside portion and an inside portion,
      a device for axially rotating the rod, the outside portion attached to said device,
      a disk having a center, a perimeter and a perimeter surface, the inside portion of the rod attached to the disk between the center and the perimeter of the disk and the perimeter surface is the cam surface.

3. The screen retainer of claim 1,
wherein
   the tensioning device is formed in part of a polymeric material and
   the tensioning device has a recess for receiving the disk and defined by the bearing surface,
   the spring is an elongated spring embedded in the polymeric material and laying in a plane which is substantially parallel to the side wall when the tensioning device is in an installed position, and
   the at least one screen contact surface are two screen contact surfaces extending below a lower surface of the tensioning device,
   wherein the elongated spring is located between the hole and the screen contact surfaces and wherein the two screen contact surfaces are spaced from each other to allow deflection of the lower surface and the elongated spring when the tensioning device is in a position for retaining the framed screen.

4. The screen retainer of claim 3, wherein the disk is removably received by the recess.

5. The screen retainer of claim 1, wherein
   the tensioning device has
      an upper portion;
   the spring is an elongated spring having first and second end portions and a mid portion; and
   the at least one screen contact surface is two screen contact surfaces,
      wherein the elongated spring is located between the upper portion and the two screen contact surfaces,
      wherein one screen contact surface is located on the first end portion and the other screen contact surface is located on the second end portion,
      wherein the upper portion is attached to the mid portion and has a recess for receiving the disk and defined by the bearing surface.

6. The screen retainer of claim 1, wherein
   the tensioning device has
      a first portion having a recess for receiving the disk and defined by the bearing surface, and
      a second portion formed of an elastomeric polymer and has a screen contact portion, the second portion deforming in part when the tensioning device is retaining a framed screen which results from compressing a part of the second portion between the perimeter surface and the framed screen,
   wherein the second portion is attached to the first portion,
      the at least one screen contact surface is the screen contact portion, and
      the spring is the part of the second portion which is compressed when the tensioning device is retaining a framed screen.

7. A shale shaker comprising:
   a base;
   at least one shaker screen;
   a basket mounted movably with respect to and on the base;
   a screen support mounted within the basket; and
   a screen retainer for releasably mounting a shaker screen to the screen support within the basket, the screen retainer having at least a cam surface; and
   a tensioning device having at least
      a bearing surface in contact with the cam surface,
      a spring responsive to the bearing surface, and
      at least one screen contact surface for engaging and placing a compressive force on the shaker screen positioned on the screen support when the spring is placed in compression by the exertion of force by the cam surface on the bearing surface,
   wherein the cam surface and tensioning device are located within the basket.

8. The shale shaker of claim 1,
   wherein the basket has a side wall and a sleeve attached to the side wall with a hole extending substantially perpendicular to the side wall through the sleeve and side wall,
   wherein the screen retainer has
      a rod extending through the hole, the rod having an outside portion and an inside portion,
      a device for axially rotating the rod, the outside portion attached to said device, a disk having a center, a perimeter and a perimeter surface, the inside portion of the rod attached to the disk between the center and the perimeter of the disk and the perimeter surface is the cam surface.

9. The shale shaker of claim 7, wherein the tensioning device is formed in part of a polymeric material and the tensioning device has a recess for receiving the disk and defined by the bearing surface, the spring is an elongated spring embedded in the polymeric material and laying in a plane which is substantially parallel to the side wall when the tensioning device is in an installed position, and the at least one screen contact surface are two screen contact surfaces extending below a lower surface of the tensioning device, wherein the elongated spring is located between the hole and the screen contact surfaces and wherein the two screen contact surfaces are spaced from each other to allow deflection of the lower surface and the elongated spring when the tensioning device is in a position for retaining the shaker screen.

10. The shale shaker of claim 9, wherein the disk is removably received by the recess.

11. The shale shaker of claim 7, wherein the tensioning device has an upper portion;

the spring is an elongated spring having first and second end portions and a mid portion; and the at least one screen contact surface is two screen contact surfaces, wherein the elongated spring is located between the upper portion and the two screen contact surfaces, wherein one screen contact surface is located on the first end portion and the other screen contact surface is located on the second end portion, wherein the upper portion is attached to the mid portion and has a recess for receiving the disk and defined by the bearing surface.

12. The shale shaker of claim 1, wherein the tensioning device has a first portion having a recess for receiving the disk and defined by the bearing surface, and a second portion formed of an elastomeric polymer and has a screen contact portion, the second portion deforming in part when the tensioning device is retaining a shaker screen which results from compressing a part of the second portion between the perimeter surface and the shaker screen, wherein the second portion is attached to the first portion, the at least one screen contact surface is the screen contact portion, and the spring is the part of the second portion which is compressed when the tensioning device is retaining a shaker screen.

* * * * *